July 21, 1970     I. L. SELDIN     3,521,060
METHOD FOR DETECTING THE MISROUTING OF TRANSPARENCIES
DURING THE PROCESS OF IMAGING THEREON
Filed Aug. 24, 1967
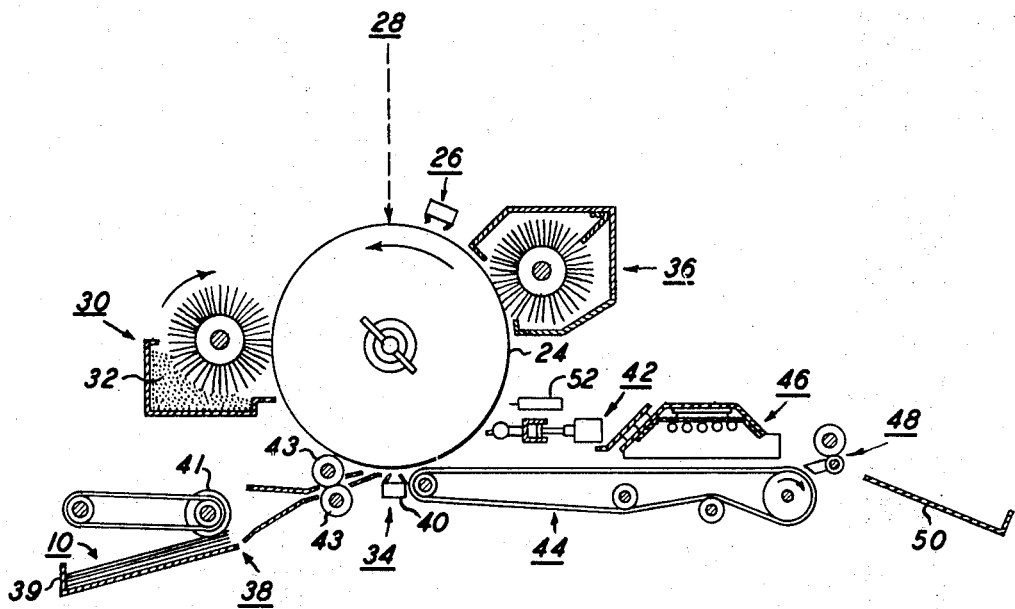
INVENTOR.
IRA L. SELDIN
BY David C. Petre
James J. Ralovate
ATTORNEYS

United States Patent Office 3,521,060
Patented July 21, 1970

3,521,060
METHOD FOR DETECTING THE MISROUTING OF TRANSPARENCIES DURING THE PROCESS OF IMAGING THEREON
Ira L. Seldin, Penfield, N.Y., assignor to Xerox Corporation, Rochester, N.Y., a corporation of New York
Filed Aug. 24, 1967, Ser. No. 662,984
Int. Cl. G03g 5/10, 13/22
U.S. Cl. 250—65                    14 Claims

ABSTRACT OF THE DISCLOSURE

A detection system especially adapted for use in imaging machines, wherein a transparent image receiving member with a transparentizable light reflecting portion is advanced into an imaging machine with the reflective portion in its light reflective condition (a) at least until it encounters at least one light responsive misrouting detection means, or (b) at least until it passes at least one possible misroute with light responsive misrouting detection means disposed operatively along said misroute, whereupon said transparentizable light reflecting portion is transparentized, to provide an imaged transparency substantially completely devoid of any light reflective portions. The system hereof may also be used to detect the position or misrouting of transparencies in a variety of non-imaging environments where transparencies are routed.

BACKGROUND OF THE INVENTION

This invention relates to a detection system and more particularly to a system for detecting misroutings of transparencies in routing systems, for example imaging machines with at least one light responsive misrouting detection device.

Although opaque paper is commonly used as an image receiving member, certain fibrous and nonfibrous substantially transparent flexible image receiving materials which may commonly be relatively plastic polymeric materials are being increasingly employed as image receiving members for certain imaging applications. These transparent members are often more durable than opaque paper and after receiving the image, have great utility, for example, as transparencies used in conventional projectors to project images on a screen, for example, for group presentation. However, a problem has arisen in that many currently available imaging machines are peculiarly adapted to feed opaque paper and certain operational difficulties have arisen when transparent image receiving members are substituted for paper, in such machines.

One such operational problem, which is obviated by the invention hereof, is the misrouting of transparencies within a machine due to non-activation of light responsive misrouting detection devices which are responsive to electromagnetic radiation, for example, light reflected off of the misrouted imaging member, for example paper. One such typical device is illustrated in copending application Ser. No. 403,844, filed Oct. 14, 1964, and employs a photocell to detect the presence or absence of a sheet of light reflecting transfer material, for example paper, to determine whether the transfer material has been routed in the proper path within the machine. Commonly, an improper routing of an image receiving member will cause the device to deactivate the machine, to avoid costly paper jams within the machine and to facilitate dejamming procedures. It is found that a misrouted transparency (herein also intended to include translucent members) will often not activate such a device, with attendant undesirable consequences.

One approach to obviate this problem is described in copending application Ser. No. 598,279, filed Dec. 1, 1966, wherein each transparent imaging member is backed temporarily with opaque paper, which is light reflecting, or by rendering the leading edges of transparent receiving sheets light reflective, by equipping them with a strip of paper or other light reflective material such as paint, which if desired, may be detachable from the remaining portion of the transparency after imaging. As advantageous as this approach is, in one embodiment it calls for a paper backing coextensive with each transparency which calls for paper and productions costs which are obviated by the present invention; and in the other embodiment a permanent mark is left on the transparency itself which renders useless the marked portion of the image receiving member. If this marked portion is at a leading or a side edge, a somewhat oversized transparency is required, as well as a slight misregistration of the original in order to optically align the light and shadow image pattern from the original on the nonmarked or completely transparent portions of the image receiving member.

Thus, there is a continuing need for better systems to detect misrouted transparencies particularly in imaging machines utilizing transparencies as the image receiving member and especially in those imaging machines adapted to process more conventional light reflective, opaque image receiving materials, such as paper.

SUMMARY OF THE INVENTION

It is, therefore, an object of this invention to provide a system to advance a transparency, especially in an imaging machine, which overcomes the above-noted disadvantages and satisfies the above-noted wants.

It is another object of this invention to provide a system to image a transparency which does not require a paper backing on the transparency.

It is a further object of this invention to provide a transparency imaging system wherein the resultant imaged transparency is devoid of non-transparent non-image areas which would interfere with a projected image of the transparency.

It is a further object of this invention to provide a transparency imaging system wherein the transparency may be fed alone through imaging apparatus, but is nonetheless capable of activating a light responsive misrouting detection device within the apparatus to detect misrouting of transparencies within the machine.

The foregoing objects and others are accomplished in accordance with this invention wherein a transparent image receiving member with a transparentizable light reflecting portion is advanced into an imaging machine with the reflective portion in its light reflective condition (a) at least until it encounters at least one light responsive misrouting detection means, or (b) at least until it passes a possible misroute with light responsive misrouting detection means disposed operatively along said misroute, whereupon said transparentizable light reflecting portion is transparentized, to provide an imaged transparency substantially completely devoid of any light reflective portions. The system hereof may also be used to detect the position or misrouting of transparencies in a variety of non-imaging environments where trannsparencies are routed.

BRIEF DESCRIPTION OF THE DRAWING

For a better understanding of the invention as well as other objects and further features thereof, reference is made to the following detailed disclosure of this invention taken in conjunction with the accompanying drawing wherein:

The figure is a partially schematic side view of an automatic xerographic type copying apparatus similar to the Xerox 914 copier, with a light responsive misrouting detection device, for carrying out a preferred embodiment of the invention.

DESCRIPTION OF THE PREFERRED EMBODIMENTS

Although the figure and the detailed description of the figure refer to a xerographic imaging machine and to a particular preferred system of advancing and imaging a transparency with a transparentizable light reflective portion, in an imaging machine with at least one light responsive misrouting detection device, with subsequent transparentizing of said light reflective portion, by heat, as will be described; it is to be understood that any suitable means of rendering a selected portion of a transparency, temporarily light reflective, and of subsequently transparentizing said portion after said light reflective portion has encountered at least one light responsive misrouting detection means, may be used herein. The broad concept of the invention is to render temporarily light reflective, a portion of a transparency, the placement of the portion selected to engage, assuming a misrouting, at least one light responsive misrouting detection means, as the transparency is advanced through an imaging machine, said light reflective portion subsequently being transparentized. The selected light reflective portion may be the entire transparency or a very small area on an otherwise transparent member, the only requirement being that the area be sufficiently large in area and sufficiently light reflective to activate the particular light responsive misrouting detection means.

Transparentizing and providing a transparentizable portion that will transparentize in response to heat energy and optimumly in response to that amount of heat energy sufficient to heat fix a xerographic particulate image is found to be a preferred mode of practicing the invention since such a sequence may be accomplished in commercially available imaging machines, such as the Xerox 914 copier, without special machine adaptations.

Other modes of rendering a portion of a transparency light reflective and subsequently transparentizing said portion, which may require system adaptations of existing imaging machines if incorporated as a part thereof, but which may be used herein where suitable, include:

(a) "Blushing" transparencies in selected portions by drying a transparency formed of or selectively portion coated with, a blushable material, for example lacquers and photopolymerizable materials, in a humid ambient atmosphere, for example, as described in copending application Ser. No. 362,982, filed Apr. 27, 1964;

(b) "Blushing" by treating the selected portion with a non-solvent liquid, for example, as described in copending application Ser. No. 576,649, filed Sept. 1, 1966;

(c) Forming visibly opaque, heat transparentizable portions as described in Workman Pat. 3,218,168 utilizing a photocrosslinkable polymer and optionally using a steam treatment when said polymer material is still tacky as it is being dried to form a film;

(d) Placing a thin microporous light reflecting polyamide as described in Chemical & Engineering News, April 17, 1967, p. 16, on a selected portion of a transparency. The opaque portion may be transparentized by merely exposing said light reflecting portion to ethanol vapor. Other suitable methods of temporarily rendering a material opaque and then transparentizing will occur to those skilled in the art and are intended to be included herein, including mechanical roughing of the surface of a transparency, for example, with an abrasive paper; with heating, solvent, or solvent vapor softening of the transparency material to thereby smooth out and transparentize the surface.

It will be appreciated that the invention hereof may be carried out by blushing or opacifying a transparency which is homogeneous throughout or by a transparency which has been coated or treated in a selected portion or portions with a transparentizable light reflective material.

For example, any suitable transparent, blushable material such as many photohardenable or photocrosslinkable polymers may be used as a transparency, or this material may be coated on the selected portion of a transparency material which may or may not temporarily blush under the desired conditions.

In addition, transparencies may take the form of multilayers with an outer layer temporarily blushable by any suitable method.

Any suitable transparency material in sheet or web form may be used herein including plastic material such as polysulfone thermoplastic available in sheets of roughly 4 mil thickness under the trademark Rowlox from Rowland Products, Inc., Kensington, Conn., polyethylene terephthalate polyester material available under the trademark Mylar from Du Pont and available in a wide range of thicknesses and such other film formable polymeric materials as other polyesters, polycarbonates, cellophane, polychlorotrifluoroethylene copolymers, cellulose acetate, acrylics, alpha methyl styrene copolymer, polyvinylbutyral, polystyrenes, polyethylene, cellulose, nitrate, epoxy resins, phenolics, phenolformaldehyde, silicones, urethanes, urea-formaldehydes, ethyl cellulose, polymethylmethacrylate, cellulose triacetate, cellulose acetate butyrate, polyurethane elastomer, ethyl cellulose, polypropylene, polyvinyl fluoride, vinyl-chloride-acetate copolymers, vinylidene chloride-vinyl chloride copolymer, copolymers of hexafluoropropylene and polytetrafluoroethylene, polyvinyl chloride, polyacrylonitrile, polyvinyl alcohol, polyvinylidine-fluoride, copolymers of chlorotrifluoroethylene and vinylidine fluoride and other polymeric materials as well as transparent papers such as a 100% rag stock transparentized sheet and roll transfer material available under the designation 266 from Plastic Coating Corp. or thin wood fiber transparent papers.

A preferred mode of practicing the invention is to use a xerographic heat fixing imaging machine as schematically illustrated in the figure with a preferred class of transparentizable thermoplastic materials which may form the transparency itself or be placed in a selected portion on a transparency which may or may not be capable of being rendered temporarily light reflecting and then transparenentized. This preferred class of transparentizable thermoplastics are transparentized, after being rendered temporarily light reflective, in response to that amount of heat energy sufficient to heat fix a xerographic toner particulate image. More particularly it is found that said preferred class of thermoplastics for use herein are those which are normally nontacky at room temperature, such as between about 60 and 80° F., and which have melting points between about 150° F. and 300° F., which includes those materials described in Van Dorn Pat. 2,855,324 especially in columns 2 and 3 thereof, as well as alpha methyl styrene-vinyl toluene copolymers, copolymers of styrene and N-butyl methacrylate, polyolefins, for example, Piccopale H2 available from Pennsylvania Industrial Chemical Corp., polystyrenes, for example. Piccolastic D75 and A75 also available from Pennsylvania Industrial Chemical Corp., acrylics, for example, B82 resin available from Rohm & Haas Co. and alkyds, for example, Neolyne 23 available from Hercules Powder Co.

Referring now to the figure, there will be described a prefered mode of practicing this invention wherein the transparentizing of the light reflective portion is accomplished by the heat fuser of a commercially available imaging machine, the Xerox 914 copier.

In the process of xerography, for example, as disclosed in Carlson Pat. 2,297,691, issued Oct. 6, 1952 a xerographic plate comprising a layer of photoconductive insulating material on a conductive backing is given a uniform electric charge over its surface and is then exposed to a light and shadow image pattern of the subject matter, the original, to be reproduced. This exposure discharges the plate areas in accordance with the radiation intensity that reaches them and thereby creates an electrostatic latent image on or in the photoconductive layer corresponding to the light and shadow image pattern. Development of the latent image is effected with an electrostatically charged, finely divided material, such as an electroscopic powder called toner, that is brought into surface contact with the photoconductive layer and is held thereon electrostatically in a pattern corresponding to the electrostatic latent image. The developed, xerographic marking material image may be fixed or made permanent on the xerographic plate itself. Alternatively, if it is desired, to apply the developed xerographic powder image to paper, metal foil, plastic film or other transfer material, the developed image may be transferred from the xerographic plate to such a support surface to which it may be affixed by any suitable means.

The xerographic apparatus illustrated in the figure is a partially schematic illustration of the Xerox 914 copier and shows a xerographic plate comprising a photoconductive insulating light receiving layer on a conductive backing and formed in the shape of a drum 24 which is mounted on a shaft journaled in the frame of the machine to rotate in a counterclockwise direction to cause the drum surface sequentially to pass a plurality of xerographic processing stations. At charging station 26 a uniform electrostatic charge is deposited on the photoconductive layer of the drum, for example, by a corona discharge device as illustrated. Examples of typical corona discharge devices may be found in Vyverberg Pat. 2,836,725 and Walkup Pat. 2,777,957.

At exposure station 28 a light or radiation pattern for example of an image is projected onto the drum surface to dissipate the charged drum surface in light struck areas and thereby form a latent electrostatic image of the copy to be reproduced.

At developing station 30 a xerographic developer material 32 comprising electroscopic marking particles, toner, of the type, for example, as described in Insalaco Pat. 3,079,342, 2,891,011 or Carlson Reissue Pat. 25,136 is caused to be contacted with the latent electrostatic image on the drum surface whereby the toner particles adhere to the electrostatic latent image to form a loose xerographic powder image on the drum in the configuration of the copy to be reproduced.

At transfer station 34, the loose powder image is contacted and electrostatically transferred from the drum surface to an image transfer member, for example, a transparency, as described herein.

Thereafter the drum in its rotation passes drum cleaning station 36 whereat the drum surface is brushed to remove residual toner particles remaining thereon after image transfer to ready the drum and the machine for another image reproducing cycle.

At image transfer station 34, there is shown a sheet feeding mechanism more particularly described in Eichler et al. Pat. 2,945,434 adapted to feed paper or transparencies according to this invention, to the xerographic drum in coordination with the presentation of the developed image on the drum at the transfer station. This sheet feeding mechanism generally designated 38 includes an image receiving member source such as a tray 39 to hold a stack of transparencies 10, a separating and advancing roller or rollers 41 adapted to feed seriatim the topmost transparency on the stack to feed rollers 43 by frictional contact of rollers 41 with the topmost transparency which directs it into contact with the rotating drum at a speed about equal to or slightly in excess of the rate of travel of the surface of the drum in coordination with the appearance of the developed image at the transfer station. To effect proper registration of the transparency with the feed rollers 43 and to direct it into contact with the drum, guides are positioned on opposite sides of the feed rollers.

The transfer of the powder image from the drum to the transparency is aided by means of corona charging device 40 which may be substantially similar to the device at charging station 26, which is located adjacent the point of contact between the image receiving member and the rotating drum. The corona device creates an electrostatic field which is effective to attract the toner particles comprising the image from the drum and cause them to adhere electrostatically to the surface of the transparency.

Immediately subsequent to the point of transfer is positioned a transparency stripping apparatus or pickoff mechanism 42 for removing the transparency from the drum surface. As illustrated, the device includes a plurality of small diameter multiple outlet conduits of a manifold that is supplied with a pressurized gas, for example, air by a pulsator operated by a suitable power means. The pulsator is adapted to force jets of pressurized gas through the outlet conduits into contact with the surface of the drum slightly in advance of the transparency to strip its leading edge from the drum surface and to direct it onto an endless conveyor 44 where it is carried to a fixing device preferably a heat fuser 46 whereby the developed and transferred xerographic powder image on the image receiving member is permanently fixed thereto, and where simultaneously the selected transparentizable light reflective portion of the transparency is transparentized.

After fusing, the imaged and completely transparent, except in image areas, transparency is discharged by rollers 48 to copy holder 50.

Illustrated immediately subsequent to stripping apparatus 42 in the drum rotational sequence is light responsive misrouting detection means in the form of a photocell mispuff detector 52 which operates as previously described herein to receive sufficient light reflected back to the photocell from the temporarily reflective portion of a misrouted transparency to detect the misroute and stop operation of the machine or to otherwise alert the operator to the mispuff.

Transparencies with a selected portion reflectance as low as 25 percent have been found to cause triggering of the Xerox 914 copier optical mispuff detector.

The following examples further specifically define the present invention with respect to the use of transparencies selectively, temporarily blushed. The parts and percentages are by weight unless otherwise indicated. The examples below are intended to illustrate various preferred embodiments of the imaging system of this invention employing the preferred class of transparentizable thermoplastics described herein, wherein the heat fuser of the imaging machine is the mechanism by which the light reflective portion of the transparency is transparentized.

EXAMPLE I

About a 4 mil thick, standard 8½ by 11 inch sheet of Mylar film is selectively painted with a thermoplastic in a small area of about 1 by 3 inches, centered at the leading edge of the transparency as to be in register with the photocell mispuff detector within a Xerox 914 copier which directs light at about the center of the xerographic drum and the center of misrouted imaging members. The solution painted is about a 30% solution of an alpha methyl styrene-vinyl toluene copolymer available under the designation Piccotex 100 from Pennsylvania Industrial Chemical Corp. in methyl ethyl ketone.

Piccotex 100 may be made by adding one mole of alpha methyl styrene and one mole of vinyl toluene to sufficient xylene to produce a 40 percent solution. A catalytic amount of $BF_3$ etherate is added and the mixture is stirred until polymerization is complete. After polymerization, sufficient methanol is added to decompose any $BF_3$ and then the polymer is isolated by steam distillation.

While the Piccotex 100 is drying, but while the painted spot is still tacky, the area is momentarily steamed, resulting in a whitened area.

The sheet is fed through a Xerox 914 copier and emerges imaged, with the blushed portion completely removed. Later, stringent examination of the imaging sheet with an overhead projector shows no interference with the projected image.

An identical sheet is advanced through the machine, this time with the puffer stripping mechanism turned off to cause an intentional misrouting, which activates the photocell mispuff detector to stop the machine.

EXAMPLE II

About a 4 mil thick 8½ by 11 inch sheet of polysulfone thermoplastic is rubber stamped in the same position and of the same area as in Example I with about a 5% solution of a 65/35 copolymer of styrene and N-butyl methacrylate from Pennsylvania Industrial Chemical Corp., in toluene. While the copolymer is drying, but while the stamped spot is still tacky, the area is momentarily steamed resulting in an opacified, light reflective area.

The last two paragraphs of Example I are followed with similar results.

EXAMPLE III

Example I is followed except that the Piccotex 100 coating solution is about a 30% solution of Piccotex in methyl ethyl ketone and a few drops (less than about 1%) of water and the coated solution is allowed to dry at room conditions without steaming to form a blush which is not as intense as in Example I but which nonetheless is sufficient to activate the mispuff detector in the 914 copier and which is completely removed by the heat fuser.

EXAMPLE IV

Example II is followed except that the solution of the copolymer is a 5% solution of the thermoplastic in toluene and a few drops (less than about 1%) of water. The applied solution is allowed to dry at room conditions without steaming to produce a blush which is not as intense as the blush in Example II, but which is nonetheless sufficient to cause activation of the mispuff detector in the 914 copier and which is completely removed by the heat fuser.

The imaging members prepared in the examples have excellent shelf life, several years aging being required before degradation (yellowing) of the blushable thermoplastic is objectionable, and the blush lasts indefinitely during storage.

Although specific materials, dimensions and apparatus have been described in the above description of preferred embodiments of a detection system, other suitable materials and configurations as listed herein may be used with similar results. In addition, other materials may be added to materials used herein to synergize, enhance or otherwise modify their properties. For example, suitable plasticizers, moisture proofing and other proofing agents may be added to the transparentizable materials hereof. It is clear that in the practice of this invention, both the rendering of a selected portion temporarily light reflecting and subsequent transparentizing may take place in the imaging machine itself or one or both of said opacifying or transparentizing operations may take place by an operation entirely separate in time and place from the imaging of the transparency. Also, it is understood that any suitable imaging method may be used herein.

As a further variant hereof, the blushed areas of the heat transparentizable thermoplastics hereof may be marked with, for example, instructions or advertising by stamping the blushed areas with heated metal type, for example, at a temperature of about 250° F. to cause transparentization in image configuration. In addition, the vapor transparentizable blushed materials herein may be imaged by exposing the blushed areas to the vapor through an image stencil in contact with the blushed areas.

It will be understood that various other changes in the details, materials, steps and arrangements of parts which have been herein described and illustrated in order to explain the nature of the invention will occur to and may be made by those skilled in the art upon a reading of this disclosure and such changes are intended to be included within the principle and scope of this invention.

What is claimed is:

1. A method of detecting the misrouting of transparencies comprising the steps of:
    (a) providing a transparency with at least one transparentizable light reflecting portion positioned to cooperatively engage a light responsive misrouting detection means; upon misrouting of the transparency, all of said transparentizable light reflecting portions:
        (i) comprising a thermoplastic, normally non-tacky at room temperature and which has a melting point between about 150° F. and 300° F., said thermoplastic differing in composition from said transparency material;
        (ii)-being adjacent the advancing edge of said transparency;
        (iii) consisting of either a solid area or a solid area with transparent image areas and being of a small total area when compared to the total imaging area of said transparency;
    (b) advancing said transparency until said transparency passes by at least one possible misroute with light responsive misrouting detection means disposed operatively therealong; and
    (c) after step (b), transparentizing all of said transparentizable light reflecting portions of said transparency.

2. A method according to claim 1 wherein said transparentizing is effected by the application of heat energy to the light reflecting portion.

3. A method according to claim 1 wherein said light reflecting portion comprises a light reflecting polyamide and said transparentizing is accomplished by exposing said light reflecting polyamide to ethanol vapor.

4. A method according to claim 2 wherein said thermoplastic is selected from the group consisting of alpha methyl styrene-vinyl toluene copolymers, styrene and N-butyl methacrylate copolymers, polyolefins, polystyrene, acrylics, alkyds and mixtures thereof.

5. A method of detecting the position, along a route, of transparencies comprising the steps of:
    (a) providing a transparency with at least one transparentizable light reflecting portion positioned to cooperatively engage a light responsive position routing detection means when said transparency is at a certain predetermined position along a predetermined route, all of said transparentizable light reflecting portions:
        (i) comprising a thermoplastic, normally non-tacky at room temperature and which has a melting point between about 150° F. and 300° F., said thermoplastic differing in composition from said transparency material;
        (ii) being adjacent the advancing edge of said transparency;
        (iii) consisting of either a solid area or a solid area with transparent image areas and being of a small total area when compared to the total imaging area of said transparency;
    (b) advancing said transparency until the light reflecting portion thereof cooperatively engages said light responsive routing position detection means; and
    (c) after step (b), transparentizing all of said transparentizable light reflecting portions of said transparency.

6. A method according to claim 5 wherein said transparentizing is effected by the application of heat energy to the light reflecting portion.

7. A method according to claim 5 wherein said light reflecting portion comprises a light reflecting polyamide and said transparentizing is accomplished by exposing said light reflecting polyamide to ethanol vapor.

8. A method according to claim 6 wherein said thermoplastic is selected from the group consisting of alpha methyl styrene-vinyl toluene copolymers, styrene and N-butyl methacrylate copolymers, polyolefins, polystyrene, acrylics, alkyds and mixtures thereof.

9. An imaging method comprising the steps of:
(a) providing a transparency with at least one transparentizable light reflecting portion positioned to co-operatively engage a light responsive misrouting detection means; upon misrouting of the transparency, all of said transparentizable light reflecting portions:
  (i) comprising a thermoplastic, normally non-tacky at room temperature and which has a melting point between about 150° F. and 300° F., said thermoplastic differing in composition from said transparency material;
  (ii) being adjacent the advancing edge of said transparency;
  (iii) consisting of either a solid area or a solid area with transparent image areas and being of a small total area when compared with the total imaging area of said transparency;
(b) advancing said transparency until said transparency passes by at least one possible misroute with light responsive misrouting detection means disposed operatively therealong;
(c) forming an image on said transparency; and
(d) after step (b) transparentizing all of said transparentizable light reflecting portions of said transparency.

10. An imaging method according to claim 9 wherein step (c) comprises forming an image pattern of toner on said transparency.

11. An imaging method according to claim 10 wherein said transparentizing is effected by the application of heat energy to the light reflecting portion.

12. An imaging method according to claim 11 wherein said heat energy is also used to fuse the toner image to said transparency.

13. An imaging method according to claim 12 wherein said thermoplastic is selected from the group consisting of alpha methyl styrene-vinyl toluene copolymers, styrene and N-butyl methacrylate copolymers, polyolefins, polystyrene, acrylics, alkyds and mixtures thereof.

14. An imaging method according to claim 12 wherein forming said image pattern of toner comprises the substeps of:
  (i) electrostatically charging a xerographic drum comprising a photoconductor layer;
  (ii) exposing said drum to a radiation pattern to form an electrostatic latent image;
  (iii) contacting said electrostatic latent image with toner to form a toner image; and
  (iv) transferring at least a portion of said toner to said transparency.

References Cited
UNITED STATES PATENTS

| | | | |
|---|---|---|---|
| 2,416,595 | 2/1947 | Reynolds | 271—57 |
| 2,953,454 | 9/1960 | Berman | 250—65.1 |
| 3,149,563 | 9/1964 | Wartman et al. | 250—65.1 |
| 3,240,932 | 3/1966 | Haines | 250—65.1 |
| 3,246,600 | 4/1966 | Wartman et al. | 250—65.1 |
| 3,278,754 | 10/1966 | Wallace | 271—57 |
| 3,280,735 | 10/1966 | Clark et al. | 250—65.1 |
| 3,360,652 | 12/1967 | Bernous | 307—252 |

RALPH G. NILSON, Primary Examiner

C. E. CHURCH, Assistant Examiner